Jan. 11, 1944.  A. M. BARRETT  2,339,044
SELECTOR AND DISPLAY DEVICE
Filed Sept. 18, 1942  4 Sheets-Sheet 1
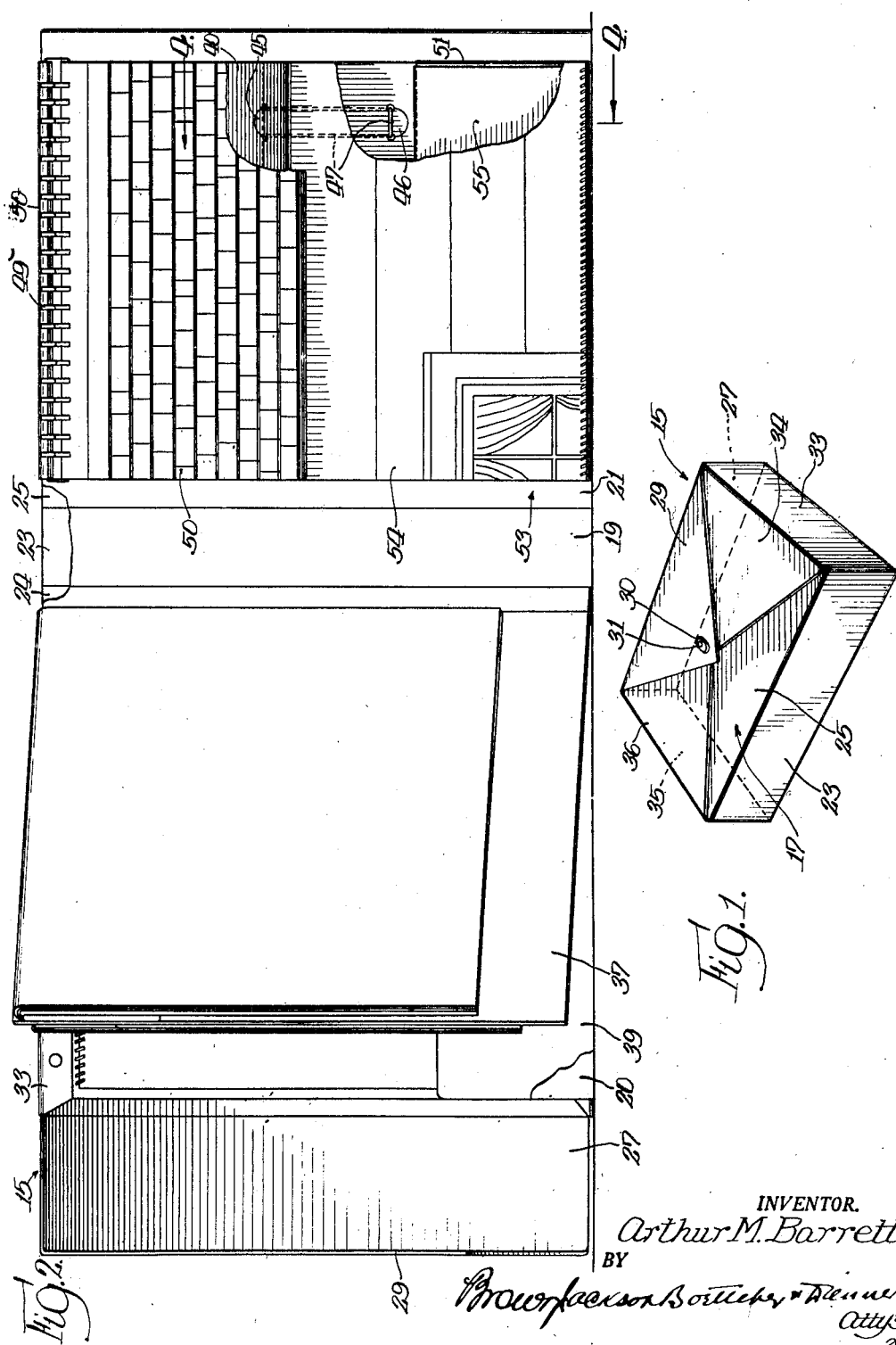
INVENTOR.
Arthur M. Barrett
BY

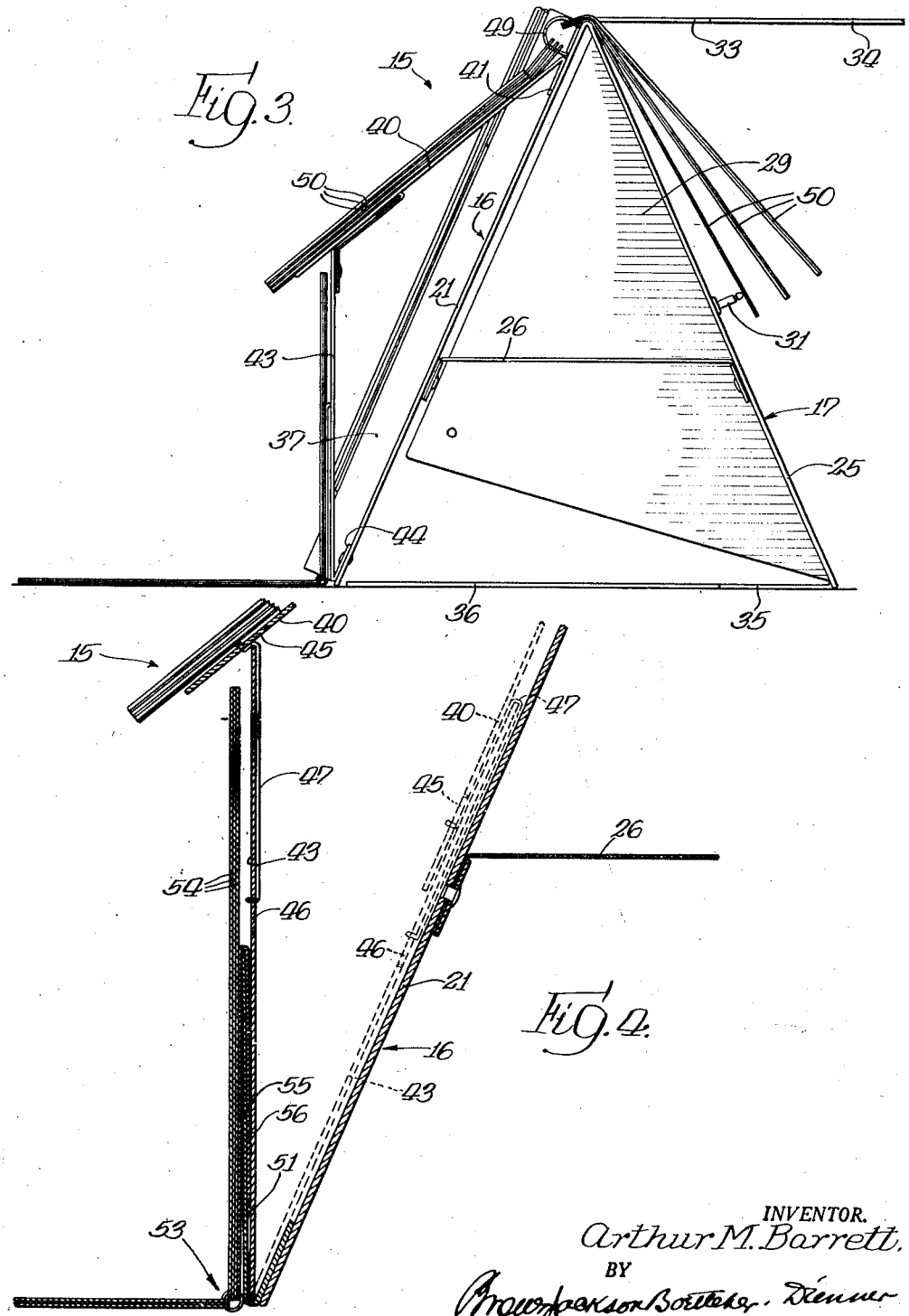

Jan. 11, 1944.　　　A. M. BARRETT　　　2,339,044
SELECTOR AND DISPLAY DEVICE
Filed Sept. 18, 1942　　　4 Sheets-Sheet 3
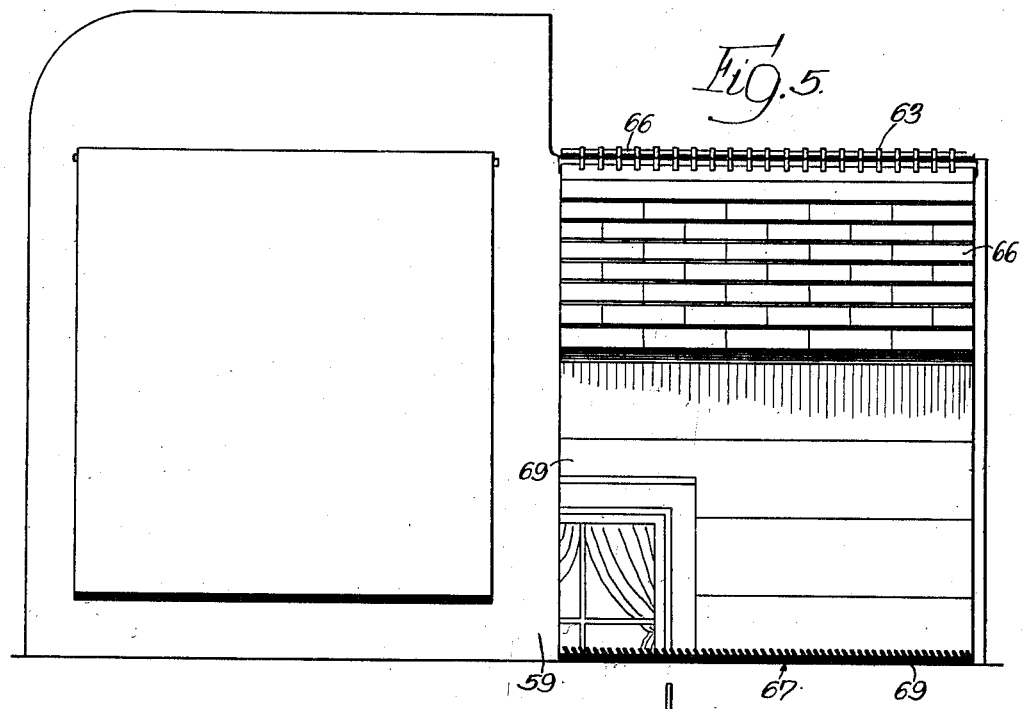
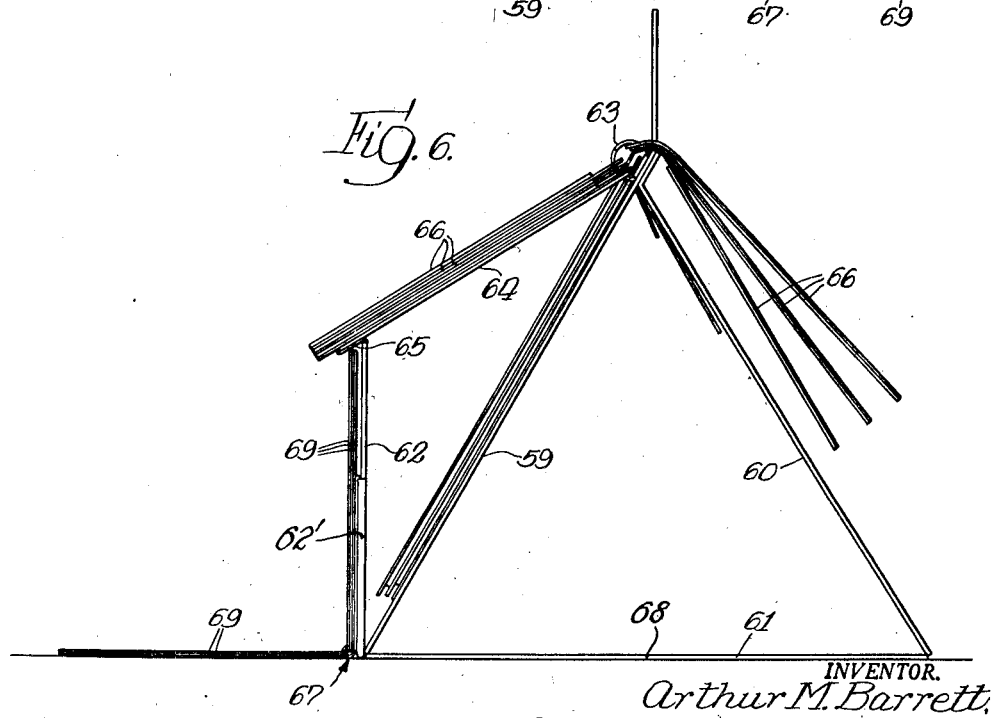
INVENTOR.
Arthur M. Barrett,
BY

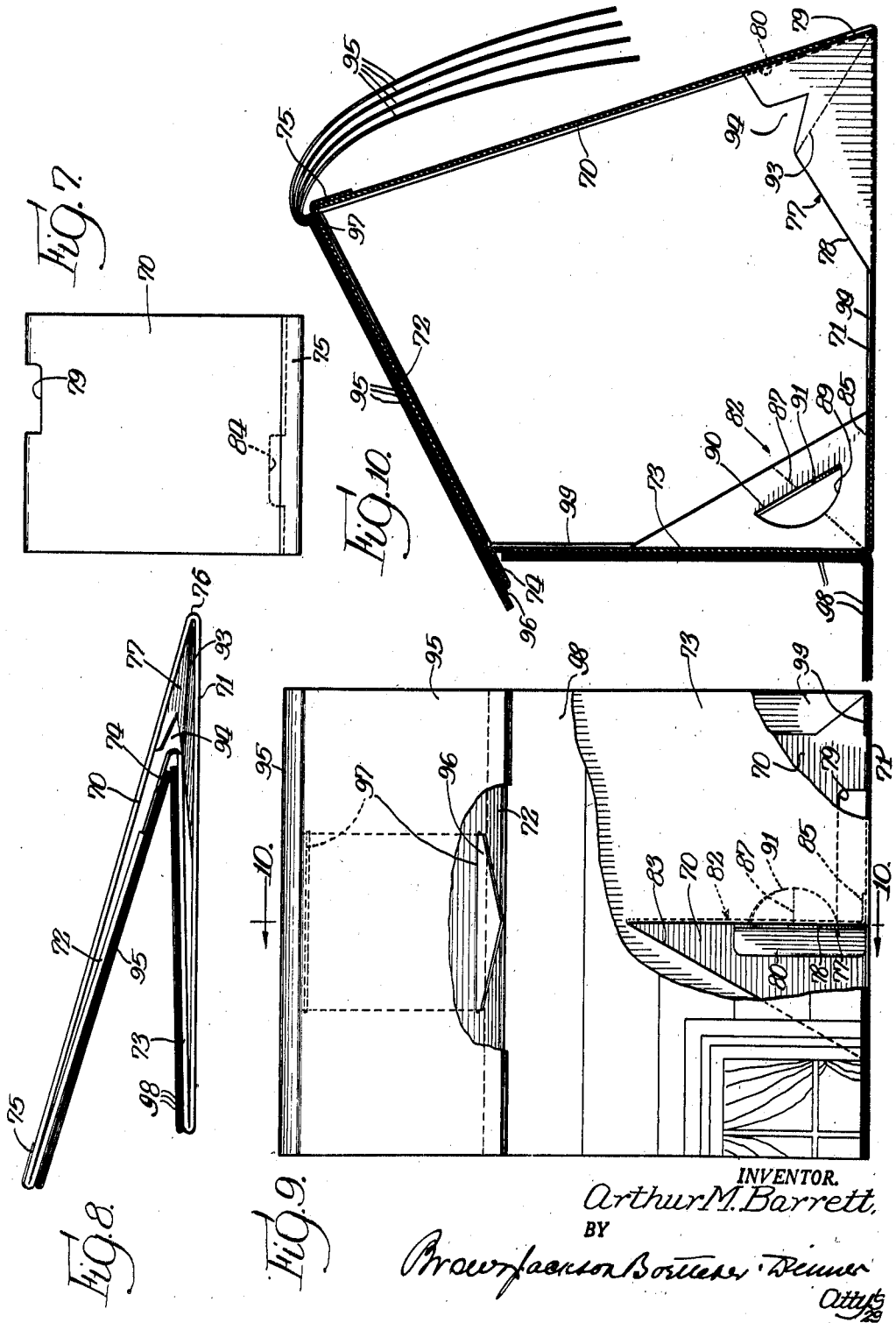

Patented Jan. 11, 1944

2,339,044

UNITED STATES PATENT OFFICE 2,339,044

SELECTOR AND DISPLAY DEVICE

Arthur M. Barrett, Winnetka, Ill., assignor to The Barrett Bindery Co., Chicago, Ill., a corporation of Illinois Application September 18, 1942, Serial No. 458,880

16 Claims. (Cl. 35—53)

The present invention relates to a display device and more particularly has to do with a device to aid in making a selection of roofing with a particular house siding, or vice versa, or both.

The present invention contemplates provision of suitable means for supporting a series of first leaves or sheets each of which simulates a different type of roofing at an angle corresponding to the slant of an inclined roof, and a second series of leaves or sheets each simulating a different type of house siding adapted to be disposed vertically and adjacent the lower end of the leaves simulating the roofings. Preferably, the leaves simulating the roofings are hingedly connected adjacent their upper end so that they may be folded rearwardly, one at a time, to expose each of them to view, selectively. Also the series of leaves simulating the house sidings preferably are hinged adjacent their lower ends so that they may be swung forwardly and downwardly, one at a time, to expose each of them to view, selectively, and in combination with any of the leaves simulating the various colors and finishings of roofings. In this manner a large number of combinations of different roofings and sidings may be portrayed in miniature to enable a person to more clearly visualize the appearance of a house finished with certain selected roofing and siding. The purpose of the device is to make the selection of either one or both of roofing and siding quicker and with greater satisfaction to a purchaser. For example, if the purchaser desires to install a new roofing on his home, the salesman selects the leaf illustrating the house siding of the purchaser's home and then the several leaves indicating the different kinds, types and colors of roofing may be selectively exposed to view in combination with the selected house siding so that the purchaser will be able to visualize the appearance of his home with any of the different roofings available.

It is an object of my invention to provide a display device comprising a plurality of first leaves simulating different roofings, and a plurality of second leaves simulating different housing sidings and arranged so that they may be disposed in the same relative position of the roof and siding of a house and selectively exposed to view.

I contemplate in the broader aspects of my invention several forms and modifications thereof all encompassing the aforementioned object, but differing from each other depending upon the purpose to which the device is to be put. As will appear more in detail hereinafter, it will be seen that I have embodied the invention in a binder which is foldable into a kit for convenient carrying by a salesman, and which is adapted to be readily set up to simulate a house in miniature to afford a selection of appropriate house siding and roofing as previously described. Also, I disclose hereinafter a display device suitable for use on a counter at a dealer's place of business. A third modification of the invention contemplates an inexpensive device made of paper which may be distributed in large quantities and produced at low cost. In the latter form of the invention the unit is foldable into a thin flat package and can be conveniently carried or distributed through the mail.

It will be understood that I have selected what I consider to be the preferred embodiments of my invention and that various modifications and rearrangements may be made without departing from the spirit and scope of my invention.

Further objects and advantages of my invention will appear from the detail description.

Now in order to acquaint those skilled in the art with the manner of constructing and utilizing my invention, I shall describe in conjunction with the accompanying drawings certain preferred embodiments of the invention.

In the drawings:

Figure 1 is a perspective view in closed position of one form of my invention convenient for use by salesmen;

Figure 2 is a front view of the device of Figure 1 in its open or set up position with a portion of the roofing and house siding leaves, a portion of the inside cover section, and a portion of a pocket carried by a panel of the inside cover section broken away to show certain details of construction of the device;

Figure 3 is an end elevational view looking from the right of Figure 2;

Figure 4 is an enlarged detail vertical sectional view through the house siding leaves and supporting panel therefor, and the leaves simulating the roofings and the supporting panel therefor in the set up position of the device taken on line 4—4 of Figure 2, and illustrating an elastic or resilient connection between the panels, the folded or collapsed position of the panels being indicated in dotted lines;

Figure 5 is a front view of another form of my invention suitable for use as a counter display;

Figure 6 is an end elevational view looking from the right of Figure 5;

Figure 7 is a front view of another modified form of my invention;

Figure 8 is a side view of the device of Figure 7 shown in partly open position to more clearly illustrate certain of the parts;

Figure 9 is a front elevational view of the device of Figures 7 and 8 in the open or set up position of the device; and Figure 10 is a detail vertical sectional view taken substantially on the line 10—10 of Figure 9 and looking in the direction indicated by the arrows.

Referring now to Figures 1 to 4, I have shown a display binder 15 having inside and outside cover sections 16 and 17, respectively. The inside cover section comprises a relatively narrow central back portion 19 and a pair of cover panels 20 and 21. The cover panels 20 and 21 are hingedly connected to the edges of the central portion 19. The outside cover section 17 is formed similar to and is substantially coextensive with, the inside cover section 16 and comprises a central portion 23 and cover panels 24 and 25. The inside and outside cover sections are hingedly connected together adjacent their top edges conveniently by means of the covering fabric for the binder. A flexible tape 26 has its opposite ends riveted or otherwise secured to the inside and outside cover sections 16 and 17 so that the lower edges of the inside and outside cover sections may be disposed in spaced apart relation to provide an easel. The outside cover panel 24 has hingedly connected to it as by the fabric cover of the binder, rectangular extension panel 27 provided with a triangular closing flap 29 which carries at the free corner thereof an apertured spring snap fastening element 30 of a character well known in the art. The outside cover panel 25 of the outside cover section 15 carries a pin 31 having an annular groove which is adapted to be engaged by the spring of the aperture locking element 30 as shown in Figure 1. A rectangular extension panel 33 is riveted to the inside cover panel 20 adjacent the hinged connection of the inside and outside cover sections 16 and 17, and is provided with a triangular flap having an opening at the free corner thereof which is adapted to be fitted over the pin 31. A rectangular extension panel 35 is suitably secured to the outside cover panel 24 of the outside cover section 17 along the edge thereof opposite the hinged connection of the outside cover section 17 with the inside cover section 16. A triangular flap 36 extends from the extension panel 35 and is provided with an opening adjacent the free corner thereof which is also adapted to be fitted over the pin 31 carried by the panel 25 of the outside cover section 17. Assuming now that the parts are in the position shown in Figure 1, in order to set up the binder the fastening elements 30 and 31 are disengaged and the flaps 34 and 36 are freed from the pin 31, and the inside and outside cover sections are positioned as shown in Figure 3 so that the device will appear when viewed from the front thereof as shown in Figure 2. Preferably, the inside and outside cover sections 15 and 16 are formed of relatively stiff material so that in the open position of the device it will be self supporting. Also the extension panels 27, 33 and 35 are of relatively rigid material so that when the kit is assembled into its closed position the device will form a relatively rigid package. The triangular closing flaps 29, 34 and 36 may be of thin flexible material such as imitation leather so that they may be conveniently folded out of the way in the open position of the device. As is well understood in the art, the inner and outer cover sections and the several extension panels are covered with suitable binding fabric and this fabric serves to hingedly connect the several parts to each other as described.

A relatively rigid leaf 37 is hinged to the inside cover section 16 adjacent the back column portion 19 and may be provided with a pocket or other suitable means for receiving actual samples of housing sidings or roofings.

Also if desired, a pocket 39 may be formed with or secured to the inside cover panel 20 of the inside cover section 16 for carrying advertising literature, price lists, other literature or samples.

Referring now more particularly to Figures 2 to 4, it will be seen that I have provided a panel 40 having an inturned portion 41 suitably secured adjacent the upper portion of the inside cover panel 21 of the inside cover section 16. A second panel 43 is formed with an inturned portion 44 along its lower edge which portion is suitably secured as by rivets to the lower portion of the inside cover panel 21 of the inside cover section 16. The panels 40 and 43 are suitably cut to provide the flaps 45 and 46, respectively, about which are looped a rubber band 47 When the panels 40 and 43 are in the dotted line position, as shown in Figure 4, the rubber band 47 is under tension and biases the panels 40 and 43 in a direction away from the inside cover section 16 to the positions shown in full lines in Figures 3 and 4. The panels 40 and 43 are designed so that the panel 40 will be disposed at an angle corresponding to the angle of an inclined roof of a house, and the panel 43 is so dimensioned that it will be disposed substantially vertically with its upper edge disposed slightly inwardly of the free edge of the panel 40. A suitable looseleaf binder mechanism 49 is suitably secured to the upper edge or top portion of the inside cover panel 21. A plurality of leaves 50 each simulating a different type or kind of roofing are hingedly supported along the upper edge of panel 40 by the hinge mechanism 49. It will be clear from Figures 3 and 4 that the leaves 50 are supported at the angle of an inclined roof by the panel 40 and that they may be turned over the hinge to expose them to view individually and selectively. As shown in Figure 3, several of the leaves simulating different roofings have been turned to the back of the device and overlie a portion of the outer cover panel 25 of the outer cover section 17.

The front face of panel 43 is provided with a pocket 51 formed in the lower portion thereof. This pocket may be formed by means of suitable flexible binding fabric in a manner well known to those skilled in the art. A ring binding device 53 carrying a plurality of leaves 54 each simulating a house siding is provided with a cover 55 having a portion 56 adapted to be inserted in the pocket 51 of the panel 43 with the hinge of the binder disposed along the lower edge thereof. The ring binder is thus disposed so that the leaves 54 may be swung downwardly to expose to view each of the leaves 54 individually and selectively.

It will thus be seen that I have provided a display device in which a plurality of leaves simulating different roofings and a plurality of leaves simulating different house sidings are disposed relative to each other and arranged to duplicate in miniature these parts of a house to vividly portray many combinations of roofings and house sidings.

It will be understood that in lieu of the ring binder 53 looseleaf mechanism such as disclosed at 49 for the several roofing leaves may be incorporated with the panel 43, or if desired, a ring binder of the character of the ring binder 53 may be suitably substituted for the looseleaf binder 49 associated with the panel 40, or any other suitable or desired mechanism or manner of hingedly mounting the roofing leaves and house siding leaves to expose them to view selectively, may be employed without departing from the spirit and scope of my invention. By providing a slight overhang of the lower edge of the panel 40 with respect to the upper vertical edge of the panel 43 in their extended positions, the roofing and house siding of a house is realistically portrayed by the present invention.

Referring now to Figures 5 and 6 I have disclosed a modified form of my invention suitable for a counter display. This device comprises front and back panel portions 59 and 60, respectively, hingedly connected together at their upper edges and provided with a base section 61 preferably formed integrally with the front and back and panels 59 and 60. The base section 61 is provided with a fold line 68 so that the front and back panel portions may be collapsed with the base section 61 disposed therebetween. A looseleaf binder mechanism 63 is secured adjacent the upper portion of the front panel 59 along the right half thereof as viewed in Figure 5. A panel 64 is provided along its upper edge with openings adapted to be disposed and retained by the looseleaf binder mechanism 63. The opposite edge of the panel 64 has secured thereto a narrow column of flexible binding fabric 65 which may be formed as a continuation of the binding fabric covering the panel 64. A second panel 62 extends from the fabric hinge 65 and is provided with a pocket 62' along the lower portion thereof. A plurality of first leaves 66 are hingedly supported along the upper edges thereof by the looseleaf binder mechanism 63 and in the position of the parts shown in Figure 6 are adapted to be raised upwardly and disposed to overlie a portion of the back panel 60 to expose each of them to view, selectively. As before the several leaves 66 each simulate a different type or character of a roof. A ring binder device 67 corresponding to the ring binder 53 of the first described embodiment is provided with a flap fitting into the pocket 62' of the panel 62 in the same manner described in connection with the embodiment of Figures 1 to 4. It will thus be seen that each of the several leaves 69 which simulate a house siding may be exposed to view individually and selectively in combination with any one of the leaves 66 simulating different types of roofing. As before the lower edge of panel 64 overlies the upper edge of vertical panel 62 an amount determined by the width of the hinge section 65.

The panels 64 and 62 are adapted to be collapsed by raising the panel 62 and disposing the back face thereof along the back face of the panel 64 so that they both may be positioned to lie substantially flat along the front panel 59. As before noted the panels 59 and 60 may also be arranged to lie flat with the base section 61 disposed therebetween so that the device of this embodiment of my invention may be collapsed for ease in shipping and handling. The left hand portion of the front panel 59 as viewed in Figure 5 may be utilized for attaching actual samples of roofing or house sidings for examination by the perspective purchaser.

Referring now to Figures 7 through 10, the embodiment therein shown comprises a binder made entirely of a single continuous sheet of paper or the like and comprises a front cover panel 70, a rear panel 71 hingedly connected to the cover panel 70 as by means of a score 76, and between which panels 72 and 73 are adapted to be folded to provide a flat package. A narrow spacing section 74 connects the lower edge of panel 72 with the upper edge of panel 73 and when the several panelse are positioned as shown in Figure 10, providing for a slight overhang of the panel 72 of the panel 73 to simulate a roof and house side. The several panels 70, 71, 72 and 73 are so proportioned that when opened they will occupy the positions substantially as shown in Figure 10 so that the panel 72 will be disposed at an angle corresponding substantially to the angle of an inclined roof of a house with the panel 73 being disposed vertically with the upper edge thereof disposed slightly within the outer lower edge of panel 72 as provided by the narrow section 74. These several panel sections may be made from a single piece of paper and the opposite ends of the paper may be overlapped as at 75 and suitably secured together as by glueing. A collapsible bracket 77 is formed between the panel sections 70 and 71 by cutting the base panel 71 along a line defining the edge 78 of the bracket 77 and by forming a suitable cutout 79 in the panel section 70 and glueing the portion 80 defined by the cutout 79 to section 70 in the position shown in Figure 9. A second collapsible bracket 82 is formed between the panel sections 71 and 73 by cutting the panel section 73 as at 83 and forming a cutout portion 84 in the section 71 and securing the portion 85 formed from the cutout 84 to the panel section 71. A diagonally extending fold line 87 extends from the intersection of the panel section 71 with the panel section 73 intermediate the ends of the collapsible bracket 82. Also, an arcuate cut 89 is formed substantially centrally of the bracket 82 and a fold line 90 permits the arcuate segment 91 to be folded at right angles to the plane of the bracket 82 to retain it in substantially vertical position. The collapsible bracket 77 is also provided with a fold 93 and is further provided with a notched V portion 94 so that when the device is collapsed the hinge section 74 and the inner end of the panel section 73 are disposed in the notch to permit the covers 70 and 71 to lie substantially flat. Also when the device is to be collapsed the arcuate portion 91 is returned to lie in the plane of the collapsible bracket 82 so that it may be folded along the fold line 87 to permit the panel section 73 to lie substantially flat along the panel 71. A plurality of leaves 95 each simulating a different type of roof are pivotally connected together adjacent their upper edges as shown in Figure 5 by any suitable means as, for example, by a plurality of staples. A tongue 96 is formed together with the plurality of leaves 95 and is adapted to be threaded through slits 97 formed in the panel section 72 for retaining the plurality of leaves in position upon the panel. Also, a plurality of leaves 98 each simulating a different house siding are connected together adjacent their lower edges by any suitable means, as for example, by a plurality of staples and the innermost leaf preferably is secured to the panel section 73 as by glueing the rear face thereof to the outer face of the panel 73. In this manner the several leaves 98 are adapted to be exposed to view selectively in combination with any selected leaf 95.

If desired, the edges of the several panel sections 70 through 74 may be turned inwardly to provide flanges 99 to add rigidity to the parts when disposed in open position.

While I have shown what I consider to be the preferred embodiments of my invention it will be understood that various rearrangements of modifications may be made therein without departing from the spirit and scope of my invention.

I claim:

1. In a display device, a first panel, means for supporting said panel in substantially upright position, a second panel hingedly connected along its upper edge to the upper edge of said first panel and adapted to be disposed at the angle of an inclined roof, a plurality of hingedly mounted leaves each simulating a roofing carried by said second panel and being adapted to be exposed to view, selectively, a third panel hingedly connected along its lower edge to the lower edge of said first panel and adapted to be disposed vertically with its upper edge disposed adjacent the lower edge of said second panel, and a plurality of hingedly mounted leaves each simulating a house siding carried by said third panel and being adapted to be exposed to view, selectively.

2. In a display device, a first panel, means for supporting said panel in substantially upright position, a second panel hingedly mounted along its upper edge adjacent the upper edge of said first panel and adapted to be disposed at the angle of an inclined roof, a plurality of hingedly mounted leaves each simulating a roofing carried by said second panel and being adapted to be exposed to view, selectively, a third panel extending substantially vertically with its upper edge hingedly connected to the lower edge of said second panel, and a plurality of hingedly mounted leaves each simulating a house siding carried by said third panel and being adapted to be exposed to view, selectively.

3. In a display device, a first panel, means for supporting said panel in substantially upright position, a second panel hingedly mounted along its upper edge adjacent the upper edge of said first panel and adapted to be disposed at the angle of an inclined roof, a plurality of hingedly mounted leaves each simulating a roofing carried by said second panel and being adapted to be exposed to view, selectively, a third panel adapted to extend substantially vertically with its upper edge disposed adjacent the lower edge of said second panel, and a plurality of hingedly mounted leaves each simulating a house siding carried by said third panel, and being adapted to be exposed to view, selectively, and means interconnecting said second and said third panel so that they may be folded to lie substantially flat upon said first panel.

4. In a display binder, a pair of hingedly connected front and back cover sections, a first panel hingedly mounted at its upper edge to one of said cover sections disposed therebetween and substantially coextensive with said covers when the same are closed, a second panel hingedly mounted along its upper edge adjacent the upper edge of said first panel and adapted to be disposed at the angle of an inclined roof, a plurality of hingedly mounted first leaves each simulating a roofing carried by said second panel and adapted to be exposed to view, selectively, a third panel hingedly connected adjacent its lower edge to the lower edge of said first panel and being adapted to be disposed substantially vertically, and a plurality of hingedly mounted second leaves each simulating a house siding carried by said third panel and adapted to be exposed to view, selectively.

5. In a display binder, a pair of hingedly connected front and back cover sections, a first panel hingedly mounted at its upper edge to one of said cover sections disposed therebetween and substantially coextensive with said covers when the same are closed, a second panel hingedly mounted along its upper edge adjacent the upper edge of said first panel and adapted to be disposed at the angle of an inclined roof, a plurality of hingedly mounted first leaves each simulating a roofing carried by said second panel and adapted to be exposed to view, selectively, a third panel hingedly connected adjacent its upper edge to the lower edge of said second panel and adapted to be disposed substantially vertically, and a plurality of hingedly mounted second leaves each simulating a house siding carried by said third panel and adapted to be exposed to view, selectively, and means disposed between said second and third panels whereby the latter may be collapsed to lie flat upon said first panel.

6. In a display binder, a pair of hingedly connected front and back cover sections, a first panel hingedly mounted at its upper edge to one of said cover sections disposed therebetween and substantially coextensive with said covers when the same are closed, a second panel hingedly mounted along its upper edge adjacent the upper edge of said first panel and adapted to be disposed at the angle of an inclined roof, a plurality of hingedly mounted first leaves each simulating a roofing carried by said second panel and adapted to be exposed to view, selectively, a third panel hingedly connected adjacent its lower edge to the lower edge of said second panel, and a plurality of hingedly mounted second leaves each simulating a house siding carried by said third panel and adapted to be exposed to view, selectively, and resilient means interconnecting said second and third panels whereby the latter may be collapsed to lie flat upon said first panel, said resilient means being adapted to bias said second and third panels to their inclined and vertical positions, respectively.

7. A display device, comprising an easel having a front wall adapted to be disposed in substantially upright position, a first panel hingedly connected adjacent its upper edge to the upper portion of said front wall, a second panel hingedly connected adjacent the lower edge of said first panel and adapted to be disposed substantially vertically, said first panel in the vertical position of said second panel being supported at the angle of an inclined roof, a plurality of first leaves each simulating a roofing carried by said second panel and being adapted to be exposed to view, selectively, and a plurality of second hingedly mounted leaves each simulating a house siding carried by said second panel and being adapted to be exposed to view, selectively.

8. A display device, comprising an easel having a front wall adapted to be disposed in substantially upright position, a first panel hingedly connected adjacent its upper edge to the upper portion of said front wall, a second panel hingedly connected adjacent the lower edge of said first panel and adapted to be disposed substantially vertically, said first panel in the vertical position of said second panel being supported at the angle of an inclined roof, a plurality of first leaves each simulating a roofing carried by said second panel and being adapted to be exposed to view, selectively, a plurality of second hingedly mounted leaves each simulating a house siding carried by said second panel and being adapted to be exposed to view, selectively, said second panel being adapted to be folded to lie between said first panel and said front wall so that said first and second panels may be positioned to lie substantially flat upon said front wall.

9. A display device comprising four panels hinged together edge to edge, two of said panels comprising front and back covers between which the other two of said panels are adapted to be folded in the closed position of the device, one of the other two panels being adapted to be disposed at the angle of an inclined roof and the other panel thereof being adapted to be disposed vertically in the open position of the device, a plurality of hingedly connected leaves carried by said one panel each simulating a roofing and being adapted to be exposed to view, selectively, and a plurality of hingedly connected leaves carried by said other panel each simulating a house siding and being adapted to be exposed to view, selectively.

10. A display device comprising four panels hinged together edge to edge, two of said panels comprising front and back covers between which the other two of said panels are adapted to be folded in the closed position of the device, one of the other two panels being adapted to be disposed at the angle of an inclined roof and the other panel thereof being adapted to be disposed substantially vertically in the open position of the device, a plurality of hingedly connected leaves carried by said one panel each simulating a roofing and being adapted to be exposed to view, selectively, and a plurality of hingedly connected leaves carried by said other panel each simulating a house siding and being adapted to be exposed to view, selectively, and hinge means disposed between said other two panels whereby the lower edge of said one panel overhangs the upper edge of said other panel.

11. A display device comprising four panels hinged together edge to edge, two of said panels comprising front and back covers between which the other two of said panels are adapted to be folded in the closed position of the device, one of the other two panels being adapted to be disposed at the angle of an inclined roof and the other panel thereof being adapted to be disposed substantially vertically in the open position of the device, a plurality of hingedly connected leaves carried by said one panel each simulating a roofing and being adapted to be exposed to view, selectively, and a plurality of hingedly connected leaves carried by said other panel each simulating a house siding and being adapted to be exposed to view, selectively, hinge means disposed between said other two panels whereby the lower edge of said one panel overhangs the upper edge of said other panel, and collapsible bracket means formed integrally with said other panel and said back cover for supporting said outer panel vertically in the open position of the device.

12. A display device comprising four panels hinged together edge to edge, two of said panels comprising front and back covers between which the other two of said panels are adapted to be folded in the closed position of the device, one of the other two panels being adapted to be disposed at the angle of an inclined roof and the other panel thereof being adapted to be disposed substantially vertically in the open position of the device, a plurality of hingedly connected leaves carried by said one panel each simulating a roofing and being adapted to be exposed to view, selectively, and a plurality of hingedly connected leaves carried by said other panel each simulating a house siding and being adapted to be exposed to view, selectively, hinge means disposed between said other two panels whereby the lower edge of said one panel overhangs the upper edge of said other panel, collapsible bracket means formed integrally with said other panel and said back cover for supporting said other panel vertically in the open position of the device, and second collapsible bracket means formed integrally with said front and back covers for supporting the latter in the open position of the device.

13. In a display binder, an outer cover section comprising a pair of hingedly connected outer front and back cover members, an inner cover section comprising a pair of hingedly connected inner front and back cover members, said cover sections being hingedly connected together along their upper edges, means for limiting spacing of the lower edges of said inner and outer cover sections away from each other to form an easel in the open position of the binder, a plurality of extension elements associated with one of the cover members of said inner and outer cover sections and being foldable over the other cover member of said outer section when said cover members are closed, a first panel hingedly mounted at its upper edge adjacent the upper edge of the other cover member of said inner cover section and adapted to be disposed at the angle of an inclined roof in the open position of the binder, a plurality of hingedly mounted first leaves each simulating a roofing carried by said first panel and adapted to be exposed to view, selectively, a second panel hingedly mounted at its lower edge to the lower edge said other cover member of said inner cover section, and adapted to be disposed vertically with its upper edge adjacent the lower edge of said first panel, a plurality of hingedly mounted second leaves each simulating a house siding carried by said second panel, and being adapted to be exposed to view, selectively, and means interconnecting said panels so that they may be folded to lie substantially flat upon said other cover member of said inner cover section.

14. In a display device, a plurality of first leaves of substantially the same dimensions adapted to be disposed in stacked relation, means for supporting said first leaves in a plane inclined to the horizontal, said first leaves being hingedly mounted adjacent their upper edges for exposing them to view, selectively, a plurality of second leaves of substantially the same dimensions adapted to be disposed in stacked relation, and means for supporting said second leaves in a substantially vertical plane, said supporting means for said first leaves being arranged with the lower portion thereof extending beyond the upper end of said supporting means for said second leaves so that the lower edges of said first leaves are adapted to overhang the upper edges of said second leaves.

15. In a display device, a plurality of first leaves of substantially the same dimensions adapted to be disposed in stacked relation, a frame comprising a first panel member for supporting said first leaves in a plane inclined to the horizontal, said first leaves being hingedly connected adjacent their upper edges for exposing them to view, selectively, a plurality of second leaves of substantially the same dimensions adapted to be disposed in stacked relation, and a second panel adapted to be disposed substantially vertically for supporting said second leaves, said first panel member being arranged with the lower portion thereof extending beyond the upper edge of said second panel so that the lower edges of said first leaves are adapted to overhang the upper edges of said second leaves.

16. In a display device, a plurality of superimposed first leaves of substantially the same dimensions each simulating a roofing, means for supporting said first leaves at the angle of an inclined roof, said first leaves being hingedly mounted adjacent their upper edges for exposing them to view, selectively, a plurality of second leaves of substantially the same dimensions each simulating a house siding and arranged in stacked relation, means for supporting said second leaves substantially vertically, said second leaves being hingedly mounted adjacent their lower edges for exposing them to view, selectively.

ARTHUR M. BARRETT.